United States Patent
Foltan et al.

(10) Patent No.: US 10,203,410 B2
(45) Date of Patent: Feb. 12, 2019

(54) PROBABILISTIC WEATHER SEVERITY ESTIMATION SYSTEM

(71) Applicant: Honeywell International Inc., Morris Plains, NJ (US)

(72) Inventors: Stanislav Foltan, Prievidza (SK); Karol Molnar, Kanice (CZ); Ales Kuchar, Kutna Hora (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/584,490

(22) Filed: May 2, 2017

(65) Prior Publication Data
US 2018/0321379 A1    Nov. 8, 2018

(51) Int. Cl.
| | |
|---|---|
| *G01W 1/08* | (2006.01) |
| *G01S 13/95* | (2006.01) |
| *G06F 17/30* | (2006.01) |
| *G08G 5/00* | (2006.01) |
| *G01S 13/88* | (2006.01) |
| *G01W 1/10* | (2006.01) |
| *G08B 23/00* | (2006.01) |
| *B64D 45/00* | (2006.01) |
| *B60K 35/00* | (2006.01) |
| *G01W 1/06* | (2006.01) |

(52) U.S. Cl.
CPC ............ *G01S 13/953* (2013.01); *G01S 13/88* (2013.01); *G01W 1/08* (2013.01); *G01W 1/10* (2013.01); *G06F 17/30867* (2013.01); *G08G 5/0091* (2013.01); *B60K 35/00* (2013.01); *B64D 45/00* (2013.01); *G01S 13/95* (2013.01); *G01W 1/06* (2013.01); *G01W 2203/00* (2013.01); *G08B 23/00* (2013.01)

(58) Field of Classification Search
CPC ........ G01S 13/953; G01S 13/95; G01W 1/00; G01W 1/06; G01W 1/08; G01W 1/10; G08G 5/0091
See application file for complete search history.

(56) References Cited

U.S. PATENT DOCUMENTS

| | | |
|---|---|---|
| 7,612,688 B1 | 11/2009 | Vigeant-Langlois et al. |
| 9,223,020 B1 | 12/2015 | Crosmer et al. |
| 9,244,157 B1 | 1/2016 | Sishtla et al. |
| (Continued) | | |

OTHER PUBLICATIONS

Search Report issued in EP 18169379.7 dated Sep. 13, 2018 (pp. 1-8).

*Primary Examiner* — Benyam Haile
(74) *Attorney, Agent, or Firm* — Bookoff McAndrews, PLLC (57) ABSTRACT

A method implementing a probabilistic weather severity estimation system is provided. The method includes gathering meteorological information from a plurality of vehicles based on a non-periodic iteratively optimized communication method that at least in part takes into consideration an vehicle's position and heading in relation to a weather event. A probabilistic weather severity estimation for future weather conditions is calculated based at least in part on the gathered meteorological information and an assigning of computed probabilistic weather severity values to nodes in a matrix. Each node is associated with a respective part of space volume in which the plurality of vehicles are gathering the meteorological information.

18 Claims, 7 Drawing Sheets

(56) References Cited

U.S. PATENT DOCUMENTS

| | | |
|---|---|---|
| 9,535,158 B1 | 1/2017 | Breiholz et al. |
| 9,689,984 B1* | 6/2017 | Breiholz ............... G01S 13/953 |
| 2007/0049260 A1* | 3/2007 | Yuhara ............... G01C 21/3694 |
| | | 455/414.3 |
| 2008/0264164 A1 | 10/2008 | Solheim et al. |
| 2009/0280855 A1* | 11/2009 | Ohwatari ............. H04B 7/0417 |
| | | 455/522 |
| 2011/0218734 A1 | 9/2011 | Solheim |
| 2013/0226452 A1* | 8/2013 | Watts ................ G01C 21/3407 |
| | | 701/528 |
| 2015/0339930 A1 | 11/2015 | McCann et al. |
| 2016/0266249 A1 | 9/2016 | Kauffman et al. |

* cited by examiner

PROBABILISTIC WEATHER SEVERITY ESTIMATION SYSTEM

BACKGROUND

Having current weather information is imperative for flight safety. Improved weather gathering systems allow for the sharing of real-time weather data as detected by an onboard weather sensors, e.g. onboard weather radar, to a ground center. This weather data may get processed (applying data fusion & prediction algorithms) and unified with other weather data at the ground station. This unified weather data may be up-linked to a subscribed aircraft (further referred as consumer aircraft). Hence, this system allows for the gathering and collating of weather information from a plurality of resources. In many systems, the request for aeronautical weather observation is initiated from the ground (e.g. periodic communication scheme of AMDAR or Mode-S Enhanced Surveillance (EHS)) in a periodic basis and in response, an onboard weather sensor sends the applicable weather data that has been requested. This data gets processed on the ground and further gets up-linked to the consumer aircraft where it is displayed on cockpit displays, electronic flight bag or tablet computer as an overlay.

SUMMARY OF INVENTION

The following summary is made by way of example and not by way of limitation. It is merely provided as a summary to aid the reader in understanding some of the aspects of exemplary embodiments. Exemplary embodiments provide a system of gathering meteorological information from a plurality of vehicles based on a non-periodic iteratively optimized communication method and determining a probabilistic weather severity estimation for future weather conditions based at least in part on the gathered meteorological information.

In one exemplary embodiment, a method implementing a probabilistic weather severity estimation system is provided. The method includes gathering meteorological information from a plurality of vehicles based on a non-periodic iteratively optimized communication method that at least in part takes into consideration a vehicle's position and heading in relation to a weather event. A probabilistic weather severity estimation for future weather conditions is calculated based at least in part on the gathered meteorological information and an assigning of computed probabilistic weather severity values to nodes in a matrix. Each node is associated with a part of space volume in which the plurality of vehicles are gathering the meteorological information.

In another exemplary embodiment, another method of implementing a probabilistic weather severity estimation system is provided. The method includes generating a matrix containing nodes and vehicle monitoring meteorological conditions within a space volume. Each node is associated with a select part of space volume within the space volume. The coverage of the monitoring of meteorological conditions by each vehicle is tracked. Nodes of the matrix are associated with vehicle monitoring of meteorological conditions coverage. An optimization process is implemented to remove at least one of at least one node and at least one vehicle from the matrix. Vehicle monitoring meteorological conditions in accordance with the then optimized matrix are requested to transmit their then current monitored meteorological conditions. Probabilistic weather severity values are assigned to each node in the then current matrix based at least in part on received meteorological information from the vehicle monitoring meteorological conditions. A probabilistic weather severity estimation for future weather conditions within the space volume based at least in part on the assigning of probabilistic weather severity values in the matrix is then generated.

In another exemplary embodiment, a probabilistic weather severity estimation system is provided. The system includes a transceiver, a memory, and a controller. The transceiver is configured to transmit and receive signals. The memory is used to store at least operating instructions and a matrix including nodes associated with parts of a space volume and vehicles gathering meteorological conditions within the space volume. The controller is in communication with the transceiver and the memory. The controller is configured to execute the instructions in the memory to populate the matrix with probabilistic weather severity values associated with the nodes based at least in part on received meteorological information from the vehicles gathering meteorological conditions within the space volume. The controller is further configured to generate probabilistic weather severity estimation information based on the probabilistic weather severity values and a model forecast. The controller is further still configured to implement an optimization process before updating the probabilistic weather severity values in the matrix.

BRIEF DESCRIPTION OF THE DRAWINGS

The drawings depict only exemplary embodiments and are not therefore to be considered limiting in scope. The exemplary embodiments are described below in detail through the use of the accompanying drawings, in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a probabilistic weather severity estimation system that includes a method of gathering meteorological information from a plurality of vehicles based on a non-periodic iteratively optimized communication method and uses a determined probabilistic weather severity estimation to predict future weather conditions. The determined probabilistic weather severity estimation being based at least in part on the gathered meteorological information and the assigning of computed probabilistic weather severity values.

Figure 1:
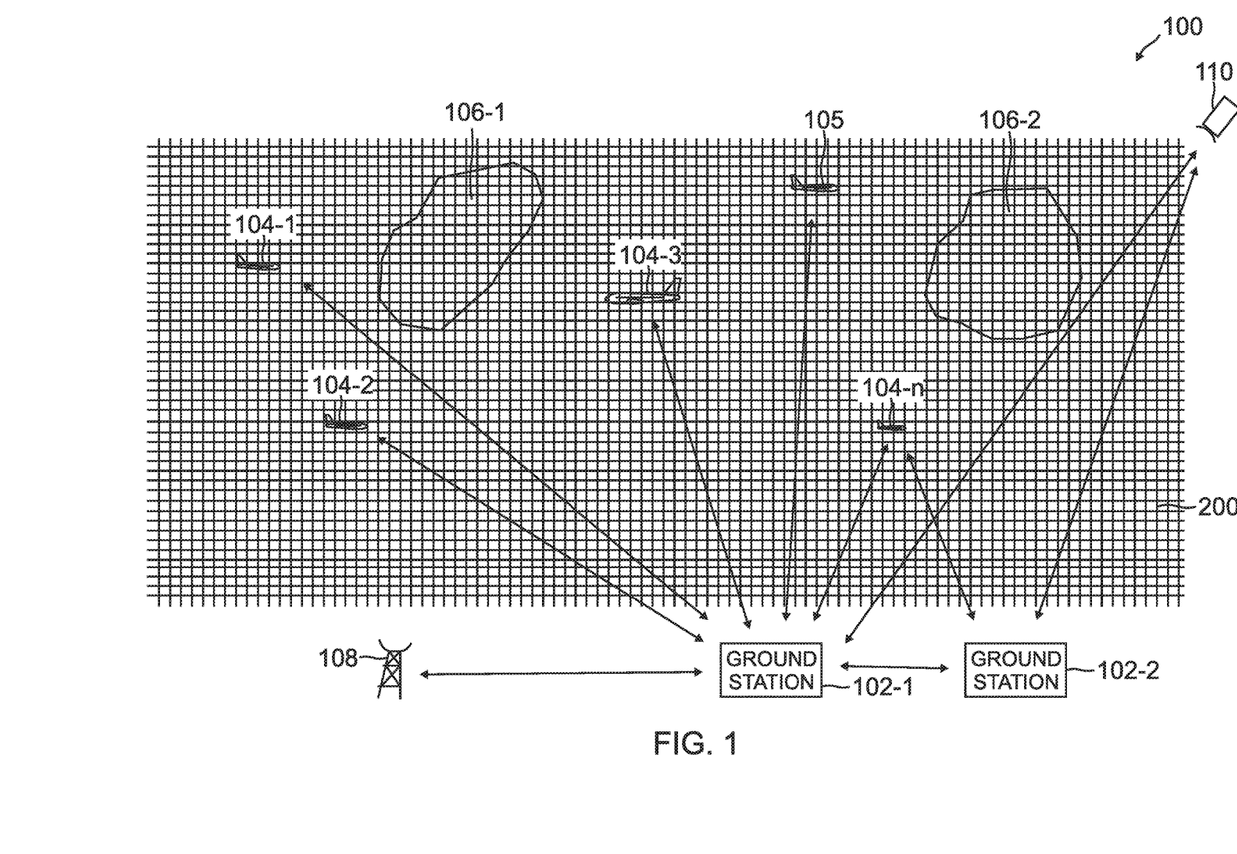
FIG. 1 is an illustration of a meteorological information collection and dissemination of an exemplary embodiment.
Figure 2:
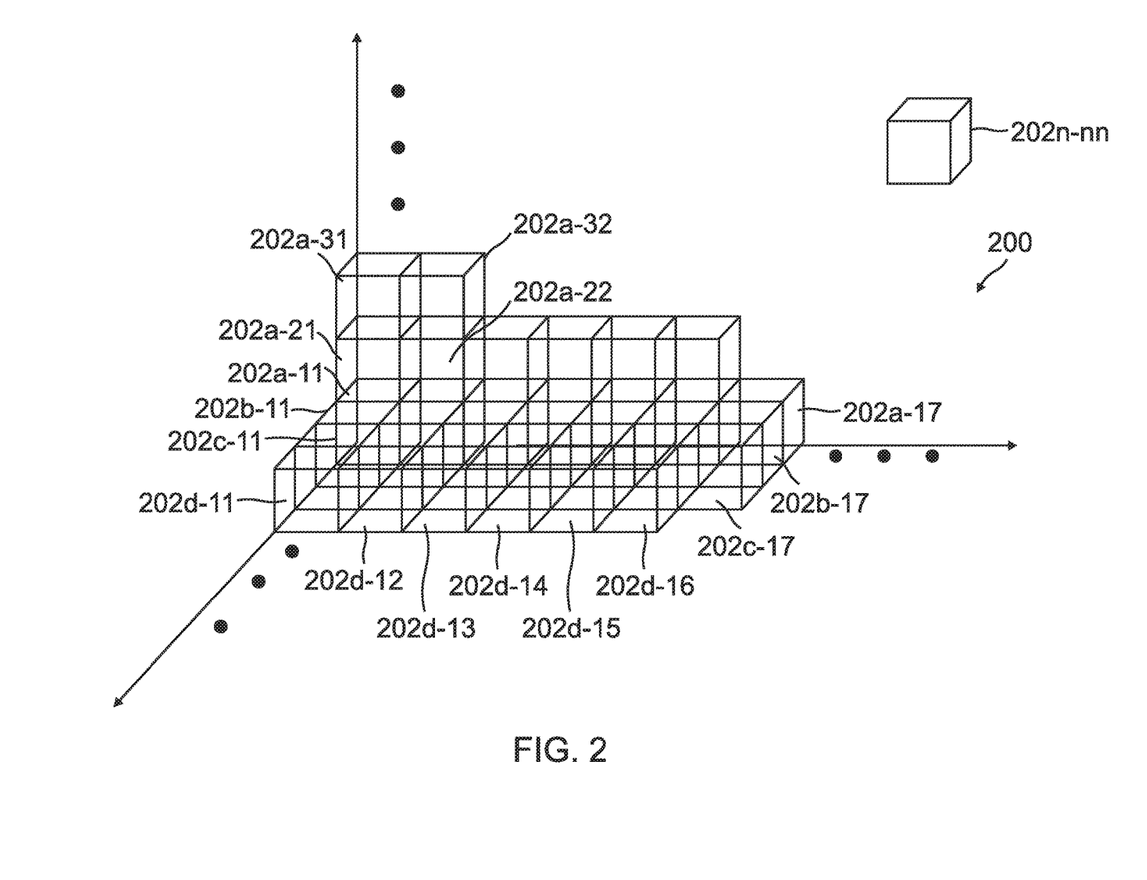
FIG. 2 is an illustration of a partial volumetric airspace grid of an exemplary embodiment.

Referring to FIG. 1, a meteorological information collection and dissemination system 100 of an embodiment is illustrated. The system 100 includes at least one ground station 102-1 or 102-2 that is in communication with meteorological information gathering vehicles, such as but not limited to, aircraft 104-1 through 104-n and consumer aircraft 105. The ground stations 102-1 and 102-2 may also be in communication with a ground based radar station 108 and a satellite system 110 or numerical weather prediction (NWP) system to gather meteorological information regarding meteorological areas of concern 106-1 and 106-2. In this exemplary embodiment, aircraft 105 is merely a consumer of meteorological information from the ground station 102-1 and is not participating in the gathering of the meteorological information. Consumer aircraft may or may not be airborne when receiving the meteorological information. The meteorological gathering aircraft 104-1 thru 104-n may also act as consumer aircraft. In embodiments, a volumetric airspace grid 200 is created by a probabilistic weather severity estimation system described below, and is used to map out locations of the meteorological gathering aircraft 104-1 through 104-n and the meteorological areas of concern 106-1 and 106-2. The volumetric airspace grid 200 is a four dimensional (three dimensional plus time) volumetric airspace grid. A partial representation of the volumetric airspace grid 200 is illustrated in FIG. 2. The grid 200 represents the complete airspace volume (or space volume) and consists of a plurality of cells of airspace grid 202a-11 through 202n-nn which represents parts of airspace volume. That is, each cell of airspace grid 202a-11 through 202n-nn is associated with a unique part of airspace volume making up the complete airspace volume through which the aircraft 104-1 through 104-n and 105 are traversing.

Figure 3:
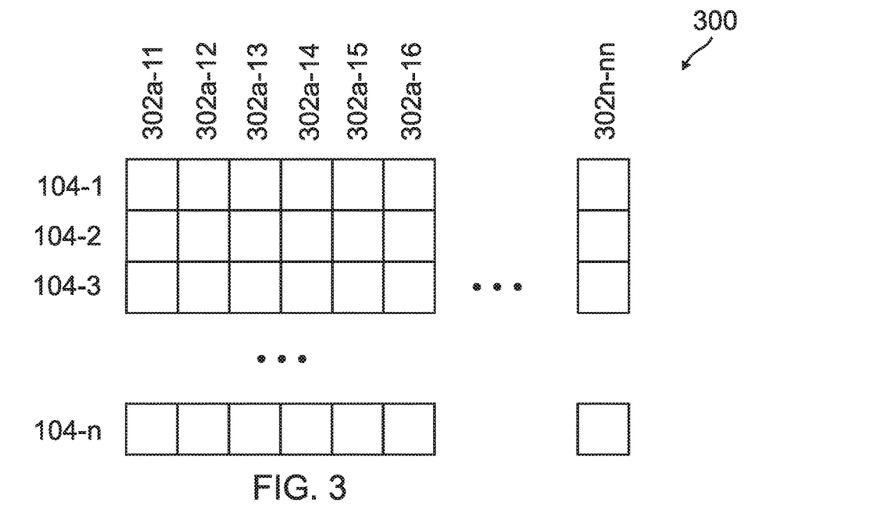
FIG. 3 is an illustration of a status matrix of an exemplary embodiment.

In embodiments, each cell of airspace grid 202a-11 through 202n-nn (which may be generally designated as just 202 hereafter) in the defined volumetric airspace grid 200 is associated with a node 302a-11 through 302n-nn in a status matrix 300. For example cell 202a-11 is associated with node 302a-11 and cell 202a-12 is associated with node 302a-12. In this example embodiment, each node 302a-11 through 302n-nn represents a column in the matrix 300. Each row in the matrix 300 is associated with a meteorological gathering aircraft 104-1 through 104-n traveling through the airspace volume as illustrated in FIG. 3. The status matrix 300 is populated with values associated with respective nodes 302a-11 through 302n-nn. A value associated with a respective node 302a-11 through 302n-nn (which may be generally designated as 302 hereafter) reflects meteorological weather information observed or predicted in the given part of airspace volume, such as intensity of precipitation, turbulence, lightening, hail, the age of the meteorological weather information, the distance of the measuring aircraft to the meteorological event, etc. In an embodiment, the values associated with each respective node 302a-11 through 302n-nn are reset, as discussed below, when new observation meteorological weather information is received. The new meteorological observation may be provided by onboard weather sensor system, e.g. onboard weather radar, of one or more of the aircraft 104-1 through 104-n.

Figure 4:
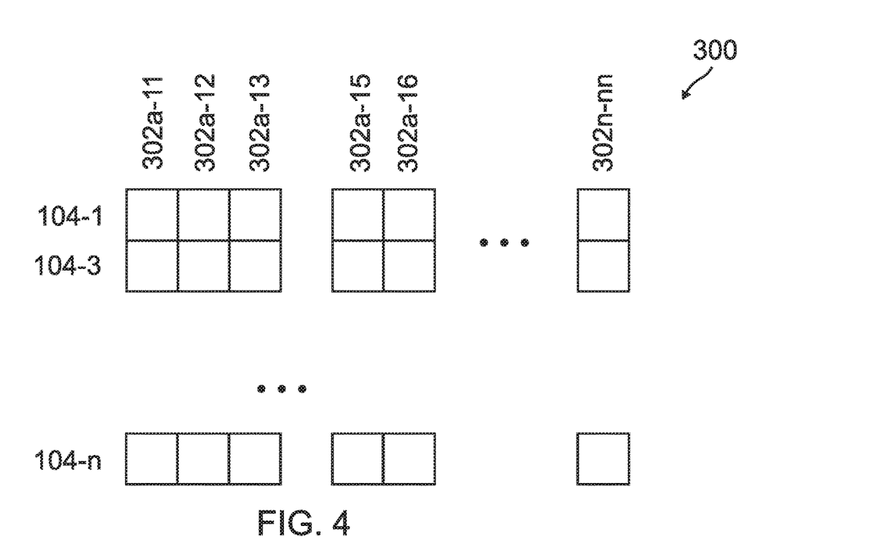
FIG. 4 is an illustration of the status matrix of FIG. 3 with a row removed in exemplary embodiment.

Embodiments use a non-periodic method of aircraft interrogation based on the need to cover the largest possible area, i.e. the highest possible number of nodes, by using the smallest number of aircraft. In an embodiment, integer linear programming is used to accomplish this non-periodic method of aircraft interrogation as further discussed below. For example, referring to FIG. 4, matrix 300 is illustrated with the removal of aircraft 104-2 and node 302a-14 after an interrogation is illustrated. For each run of the optimization algorithm only a subset of suitable aircraft is used which is composed of aircraft that are airborne at the time of interest, equipped with on board sensor, e.g. on board weather radar, and have their sensor registered to a probabilistic weather severity estimation system. Further the elimination of a node (i.e. node 302a-14) reduces the amount of data being gathered and processed for optimization purposes. Hence, parts of airspace volume which are not within the heading of an aircraft at a time of interest, not covered by any on-board sensor (or supplemental ground based radar or satellite radar system), or have little or no value are removed from the matrix to optimize the process.

Figure 5:
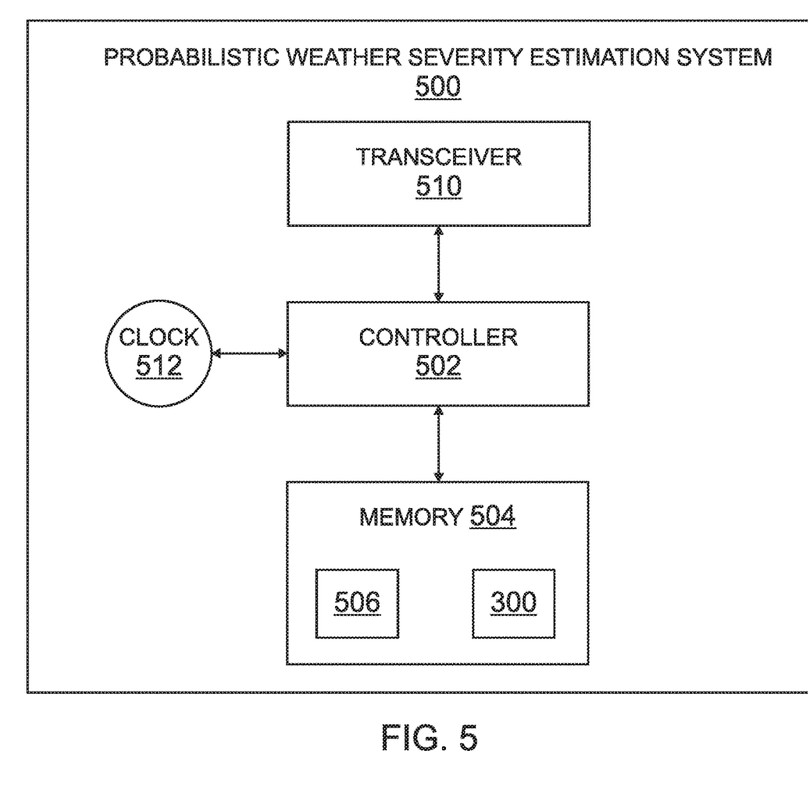
FIG. 5 is a block diagram of a probabilistic weather severity estimation system of an exemplary embodiment.

An example of a probabilistic weather severity estimation system 500 of an embodiment is illustrated in FIG. 5. The probabilistic weather severity estimation system 500 may be part of a ground station, such as ground station 102-1 or 102-2, or may be part of an aircraft system in an aircraft 104-1 through 104-n. The probabilistic weather severity estimation system 500, in this exemplary example, includes a controller 502 to control operations of the probabilistic weather severity estimation system 500, a transceiver 510, a memory 504 and a clock 512. Stored in the memory 504 is the status matrix 300 and instructions 506 that are implemented by the controller 502. The instructions 506 in embodiments may include optimization and probabilistic weather severity estimation applications as discussed in detail below. In addition, when a consumer aircraft 105 requests meteorological information, the controller 502 uses the then current probabilistic weather severity values associated with nodes 302a-11 through 302n-nn of the matrix 300 to generate meteorological information to be transmitted to the consumer aircraft 105 via the transceiver 510.

In general, the controller 502 may include any one or more of a processor, microprocessor, a digital signal processor (DSP), an application specific integrated circuit (ASIC), a field program gate array (FPGA), or equivalent discrete or integrated logic circuitry. In some example embodiments, controller 502 may include multiple components, such as any combination of one or more microprocessors, one or more controllers, one or more DSPs, one or more ASICs, one or more FPGAs, as well as other discrete or integrated logic circuitry. The functions attributed to the controller 502 herein may be embodied as software, firmware, hardware or any combination thereof. The controller 502 may be part of a system controller or a component controller. The memory 504 may include computer-readable operating instructions that, when executed by the controller 502 provides functions of the probabilistic weather severity estimation system 500 as discussed above. Such functions may include the functions of optimization described above and further discussed below. The computer readable instructions may be encoded within the memory. Memory 504 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other single or multiple storage medium.

The transceiver 510 of the probabilistic weather severity estimation system 500 is configured to receive information from external systems and transmit information to the external systems to establish communication channels. In other embodiments, a separate transmitter and receiver is used. The external systems may include a plurality of aircraft 104-1 through 104-n, satellite systems 110, ground based weather systems 108 and ground stations 102-1 or 102-2 as illustrated in FIG. 1. The probabilistic weather severity estimation system 500, as illustrated in FIG. 5, includes a clock 512 that is used by the controller 502, at least in part, to trigger the optimization process, monitor the age of received information and leave out expired data from further calculations. The interrogations of the aircraft 104-1 through 104-n during the optimization processes are provided asynchronously triggered by completion of the optimization process.

The controller 502, in embodiments, implement a probabilistic weather severity estimation application, that may be represented as instructions 506 stored in the memory 504, when generating meteorological information to be sent to a consumer aircraft, such as consumer aircraft 105. The probabilistic weather severity estimation application is designed to provide a complex prediction of weather conditions in the airspace volume with temporal and spatial resolution based at least in part on gathered meteorological conditions by the aircraft 104-1 through 104-n. Moreover, the probabilistic weather severity estimation application provides expected future weather conditions which is well suited for flight operations. The probabilistic weather severity estimation application is based on high-resolution (high enough to simulate small-scale atmospheric pressure, e.g. position of storm cells) model forecast with rapid refresh cycle (update rate: ~1 hour) combined with observed environmental conditions as gathered through the optimized aircraft polling system for the given part of airspace volume using a heuristic blending algorithm. To align the timing of input data, the observed environmental conditions are nowcasted up to a model latency period. The blending algorithm uses dynamic weights based on the past performance of both parts of the probabilistic weather severity estimation system (model data and observations) in order to improve the performance of current nowcasting technology (i.e. to decrease forecast errors within the lead time of several hours). The probabilistic forecast is generated by multiple executions of the model forecast with different initial conditions and is intended to identify the most probable trends in future behavior of the atmosphere. Probabilistic forecast represents additional information which quantifies the overall uncertainty of the status for each node of the volumetric airspace grid. Usually, probabilistic forecast is based on the ensemble weather forecast, i.e. numerical weather forecast with perturbed initial conditions, when an ensemble of forecast trajectories is created. Another approach may be based on so-called time-lagged ensemble forecast which increases the sample size at no additional computational or disk-capacity costs. This ensemble of individual forecasts is used to calculate the probability of a particular phenomenon happening. Primarily the output of the probabilistic weather severity estimation system may be used to improve situational awareness and ultimately improve flight operations on ground or board the aircraft. The overall situational awareness will be mainly enhanced by the introduction of the uncertainty estimate for the model part of the probabilistic weather severity estimation system. This allows to improve strategic and tactical decisions made based on objective risk assessment (e.g. measures of likelihood in addition to the severity of risks).

Figure 6:
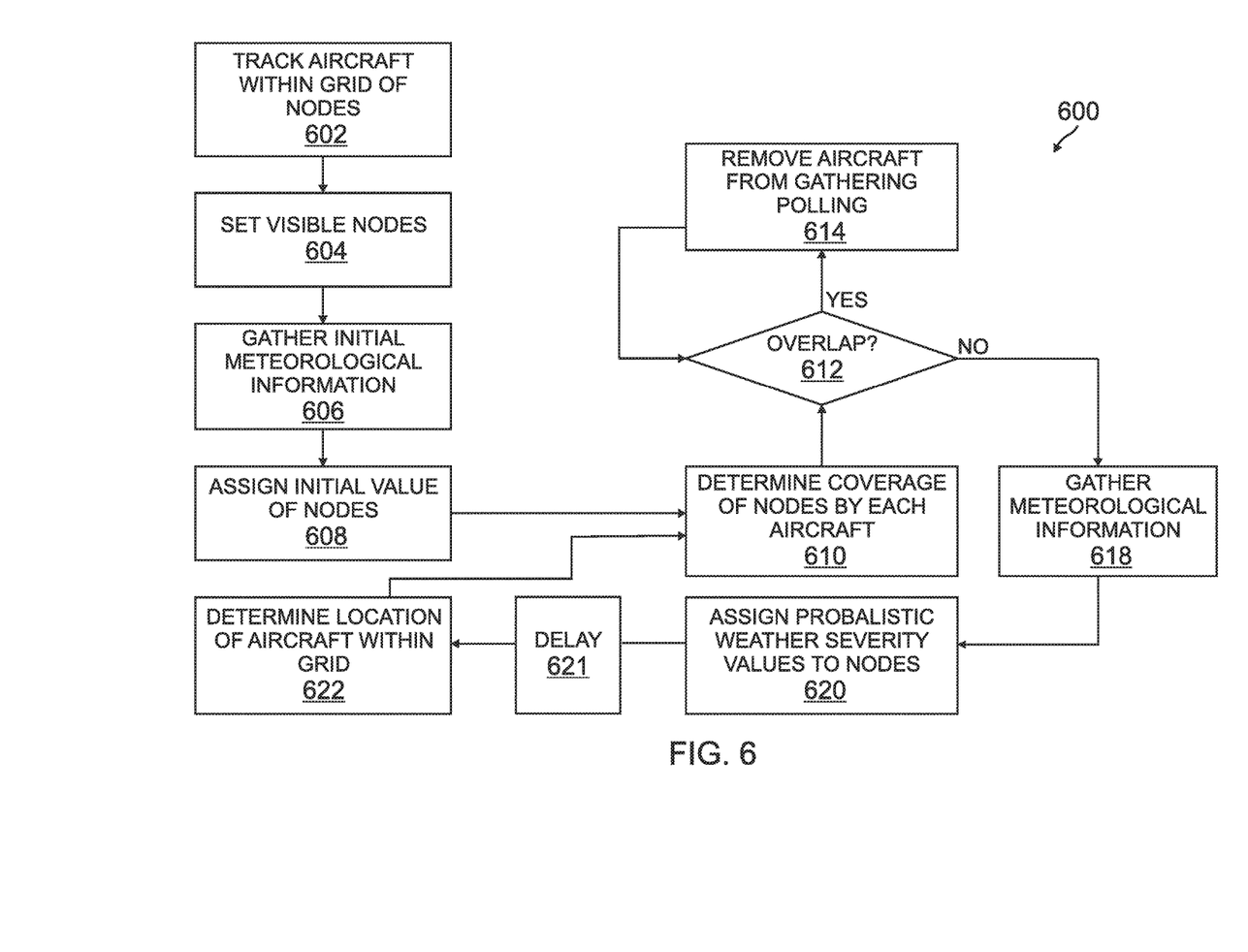
FIG. 6 is probabilistic weather severity estimation flow diagram of an exemplary embodiment.

Referring to FIG. 6 a probabilistic weather severity estimation flow diagram 600 of an exemplary embodiment is illustrated. The probabilistic weather severity estimation flow diagram 600 is shown as a series of steps (602) through (622). The sequence of the steps (602) through (620) may be in a different order in other embodiments. The process of the probabilistic weather severity estimation flow diagram 600 starts with tracking the location and travel direction of aircraft through the airspace at step (602). In an embodiment, visible nodes (i.e. nodes 302 associated with cells of airspace grid 202 in the volumetric airspace grid 200 that are being monitored by sensors of the aircraft 104-1 through 104-n) located in the airspace volume is set at step (604). Initial meteorological information is then gathered at step (606) in this exemplary embodiment. As discussed above, the meteorological information may come from plurality of aircraft 104-1 through 104-n as well as ground radar systems and satellite systems and NWP. Initial probabilistic weather severity values are then assigned to nodes of the gridded volumetric airspace model at step (608). The initial weather severity values are based at least on environmental conditions in the given part of airspace volume associated with each node. The environmental conditions may include intensity of precipitation, turbulence, lightening, hail, etc. The values may also reflect the age of information and the distance of the aircraft to the weather event.

The process then continues by determining the coverage of nodes 302 (i.e. coverage of parts of airspace volume associated with nodes 302) by each aircraft 104-1 through 104-n at the then current time at step (610). In one embodiment this is done by tracking the location of each aircraft and knowing each aircrafts capability range for detecting meteorological conditions. If it is determined there is an overlap at step (612), at least one aircraft associated with the overlap is removed from gather polling (614) (i.e. the aircraft is removed from the matrix so that future weather information requests are not transmitted to the aircraft until coverage area is reevaluated). The process then continues at step (612) reevaluating for overlaps. Once no overlap is detected at step (612), the aircraft still in the matrix 300 are polled to gather the then current meteorological information (618). New probabilistic weather severity values are assigned to the nodes 302 at step (620) based on the new meteorological information gathered at step (618). A gathering delay is then introduced at step (621). The length of the gathering delay at step (621) may vary depending on the need to update the weather information. For example, the delay may be one minute up to 30 minutes in one example embodiment depending on the then current weather conditions. If gathered meteorological information indicate rapidly changing weather conditions or severe weather conditions, the gathering delay at step (621) will be shorter while stable unchanging weather conditions may warrant a longer delay. The controller 502, with use of clock 512, implements the delay pursuant to optimization algorithm instructions 506 stored in memory 504. Upon completion of the delay at step (621), the then current location of the aircraft within the airspace volume is determined at step (622). The process continues at step (610) wherein the coverage of the nodes by each aircraft is once again determined. In one embodiment, if it is determined that the same overlap is present as was the overlap in the previous coverage determination, a different at least one aircraft is removed from the polling. This spreads the polling out among the aircraft to reduce the workload of a single aircraft.

Figure 7A:
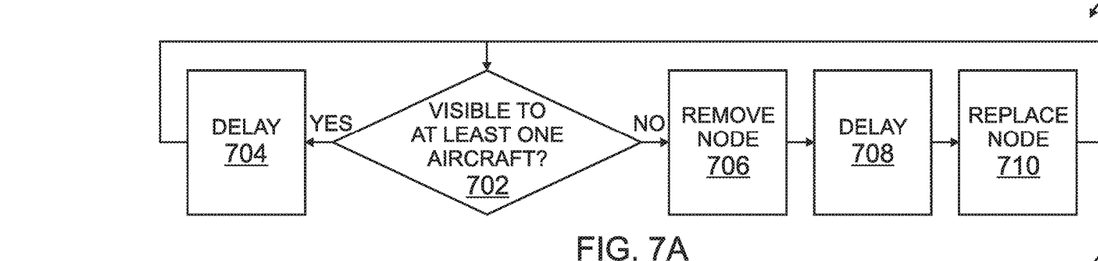
FIG. 7A is a node optimization flow diagram of an embodiment.

As discussed above, further embodiments may optimize the nodes 302 being analyzed in the matrix 300. Examples of node optimization are shown in the exemplary embodiments illustrated in FIGS. 7A through 7C. Any one or more of the exemplary embodiments may be deployed for optimization. Moreover the sequence of steps set out in each exemplary embodiment illustrated in the Figures are not limited in any particular sequential order. One exemplary embodiment of the optimization of the nodes 302 is illustrated in the node optimization flow diagram 700 of FIG. 7A. In this example, each part of airspace volume associated with a node 302 is determined if it is visible to at least one aircraft that is gathering meteorological information to the probabilistic weather severity estimation system 500 at step (702). If it is determined that the respective part of airspace volume associated with node 302 is visible by at least one aircraft that is gathering meteorological information at step (702), a reevaluation delay is introduced at step (704) for a select period of time until node 302 is evaluated again at step (702) regarding its visibility. In embodiments the reevaluation delay may be based a set time period. For example, in an embodiment, the visibility reevaluation delay is constant since the basic reevaluation is provided for each aircraft at once in this embodiment. In another embodiment, reevaluation delay may be determined based on an estimated time before the at least one aircraft will no longer be covering the respective part of airspace volume associated with the node 302. If it is determined that a respective part of airspace volume associated with a node 302 is not visible by at least one aircraft that is gathering meteorological information at step (702), the node 302 is removed from the matrix 300 at step (706). The node 302 is removed from the matrix for a select removal delay at step (708) until it is replaced in the matrix at step (710). The removal delay at step (708), may be based on a set time period. In another embodiment the delay may be based on an estimated time in which a gathering aircraft will be in position in the future to cover the respective part of airspace volume associated with the node 302. Once the node 302 is replaced, the process continues at step (702).

Figure 7B:
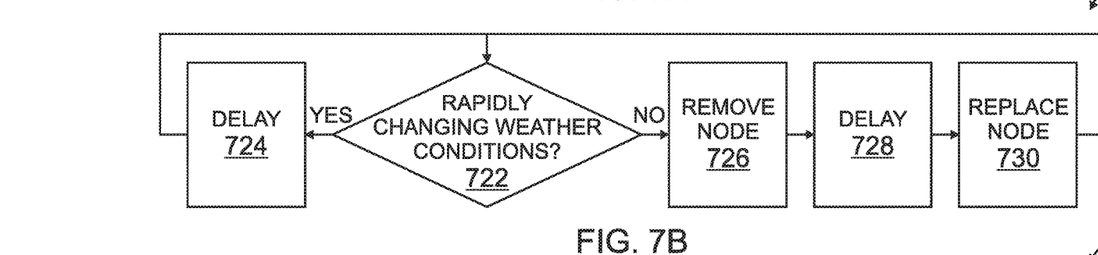
FIG. 7B is a node optimization flow diagram of another embodiment.

Another exemplary embodiment of the optimization of the nodes 302 is illustrated in the node optimization flow diagram 720 of FIG. 7B. In this example, the part of airspace volume associated with a node 302 is looked at to determine if it is subject to rapidly changing weather conditions at step (722). If it is determined that the part of airspace volume associated with a node 302 is subject to rapidly changing weather conditions at step (722), a reevaluation delay is introduced at step (724) for a select period of time until the node 302 is evaluated again at step (722). The delay may be determined based on an estimated time it may take until the rapidly changing weather condition has passed. In other embodiments, it may be based a set time period. If it is determined that the part of airspace volume 202 associated with the node 302 is not subject to rabidly changing weather conditions and the delay from the last observation has not expired at step (722), the node 302 is removed from the matrix 300 at step (726). The node 302 is removed from the matrix for a select removal delay at step (728) until it is replaced in the matrix at step (730). The removal delay at step (728), may be based on a set time. Moreover, the delay may be based on an estimated time in which a meteorological condition may occur. In one embodiment, the time associated with the gathering of meteorological information for an airspace volume is tracked (i.e. time stamp may be used). In this embodiment, the age of the latest meteorological information from the airspace volume is used to determine the delay at step (728). For example, if the information is older than a threshold value, meteorological information for the part of airspace 202 associated with the node 302 is gathered and the node value is replaced at step (730). An example threshold for the non-rapidly evolving weather conditions may be 15 minutes. Hence, delay at step (708) may be 15 minutes or more while the delay at step (704) for the rapidly changing weather condition may be for 10 minutes or less. Once the node 302 is replaced at step (710), the process continues at step (722).

Figure 7C:
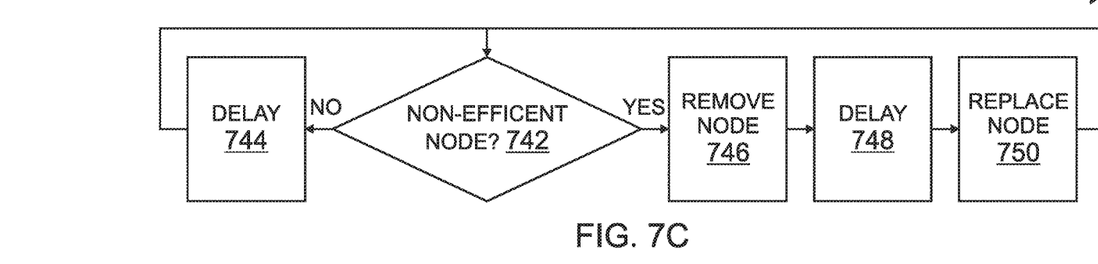
FIG. 7C is a node optimization flow diagram of yet another embodiment.

Yet another exemplary embodiment of the optimization of the nodes 302 is illustrated in the node optimization flow diagram 740 of FIG. 7C. In this example, the part of airspace volume associated with each node 302 is looked at to determine efficiency at step (742). This embodiment reduces the number of suitable nodes 302 used. In this embodiment, a degradation factor might be introduced which will allow for the removal of nodes 302 from the status matrix 300 which their associated part of airspace volume would otherwise be observed but whose observation is not efficient. For example, this may occur for nodes 302 with out of date values(s) where neighboring nodes 302 having more recent values that indicate no severe weather condition is present. In this scenario there is a high probability that in the airspace volume associated with the node 302 the weather conditions will be similar to the part of airspace volume associated with the neighboring nodes 302 and the request for an update might be postponed (i.e. it is not required to have this node involved in the current optimization process). In this process, if it is determined that a node 302 associated with a part of airspace volume is an efficient node 302 at step (742), a delay is introduced at step (744) for a select period of time until the node 302 is evaluated again at step (742). The delay time may be based on the then current weather conditions or be based on a select period of time. If it is determined that the node associated with the part of airspace volume is a non-efficient node at step (742), the node 302 is removed from the matrix 300 at step (746). The node 302 is removed from the matrix 300 for a select delay at step (748) until it is replaced in the matrix at step (750). The delay time at step (748), may be based on projected meteorological conditions, a set time, the age of the node value, etc. Once node is replaced, the process continues at step (742).

Figure 7D:
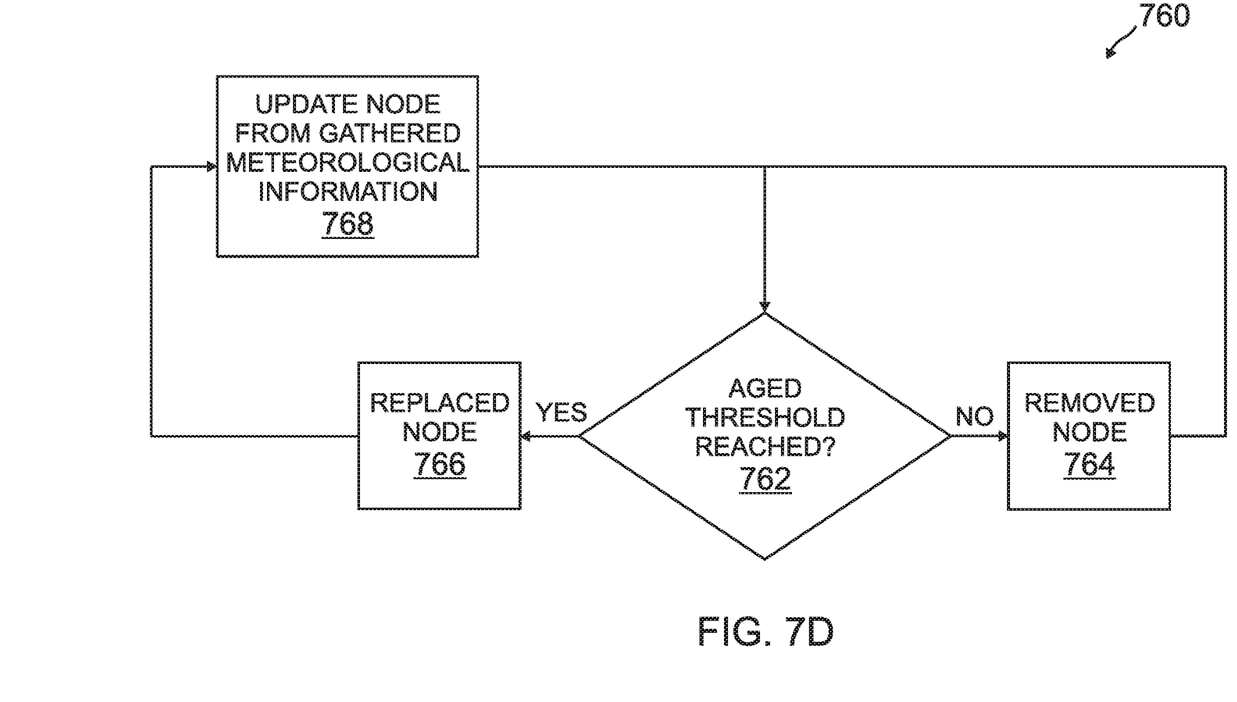
FIG. 7D is a node optimization flow diagram of still yet another embodiment.

In one embodiment, the time associated with the gathering of meteorological information for a part of airspace volume is tracked (i.e. time stamp may be used). In this embodiment, the age of the latest meteorological information associated with a node is used to determine when to use information associated with the node. For example, referring to FIG. 7D, node optimization flow diagram 760 is illustrated. In this exemplary embodiment, the aged information associated with a node 302 is tracked. If the information associated with a node 302 has not reached a set threshold at step (762), the node 302 is removed (or remains removed) from the matrix 300 until the threshold is reached. Once the threshold is reached at step (762), the node 302 is replaced at step (766). Next the meteorological information is gathered for node 302 at step (768). The process then continues at step (762) tracking the age of the information in the node 302. The aged threshold may be based on the current weather conditions valid for the part of airspace volume associated with the node 302. An example threshold for the non-rapidly evolving weather conditions may be 15 minutes or more and for the rapidly changing weather condition may be for 10 minutes or less.

In one aged time embodiment, during the construction of the initial status matrix, nodes with up to date values are not considered and are left out from the matrix and the age of value(s) assigned to nodes is updated dynamically to reflect the increasing time from the last observation. At the beginning of the optimization process all nodes are considered to have out-of-date values. After detecting meteorological information for a part of airspace volume associated with a given node, the age is set to indicate the presence of the newest information. Gradually this age is updated in order to represent the increasing time from the observation. When the age exceeds the threshold value it is considered to be out-of-date again. As discussed above, the threshold value depends on the environmental conditions observed. In the case of evolving sever weather conditions it is recommended to use a lower threshold values while in the case of stable weather conditions the threshold value may be higher.

EXAMPLE EMBODIMENTS

Example 1 is a method implementing a probabilistic weather severity estimation system. The method includes gathering meteorological information from a plurality of vehicles based on a non-periodic iteratively optimized communication method that at least in part takes into consideration a vehicle's position and heading in relation to a weather event. A probabilistic weather severity estimation for future weather conditions is calculated based at least in part on the gathered meteorological information and an assigning of computed probabilistic weather severity values to nodes in a matrix. Each node is associated with a part of space volume in which the plurality of vehicles are gathering the meteorological information.

Example 2, includes the method of Example 1, further including providing the probabilistic weather severity estimation to at least one vehicle.

Example 3 includes the method of any of the Examples 1-2, wherein the probabilistic weather severity values are associated with meteorological information related to at least one of intensity of precipitation, turbulence, lightening, hail and age of the meteorological information.

Example 4 includes the method of any of the Examples 1-3, further including determining if an overlap of monitoring coverage of a space volume associated with at least one node in the volumetric airspace grid is present with at least two vehicles. When an overlap of monitoring coverage is found present in the at least two vehicles, removing at least one vehicle of the at least two vehicles with overlap of coverage from gathering meteorological information.

Example 5 includes the method of any of the Examples 1-4, further including determining if a part of space volume associated with each node is visible to at least one vehicle. When a respective part of space volume associated with a node is not visible to at least one vehicle, removing the node from the matrix.

Example 6 includes the method of Examples 5, further including replacing the node in the matrix when the associated part of space volume becomes visible to at least one vehicle.

Example 7 includes the method of any of the Examples 1-6, further including determining if a part of space volume associated with at least one node is associated with rapidly changing weather conditions. When a part of space volume associated with the at least one node is not associated with rapidly changing weather conditions, removing the at least one node from the matrix for a period of time.

Example 8 includes the method of any of the Examples 1-7, further including determining if at least one node associated with a part of space volume is a non-efficient node. When it is determined that the at least one node is a non-efficient node, removing the at least one node from the matrix.

Example 9 includes the method of any of the Examples 1-8, further including tracking the age of the computed probabilistic weather severity values of each node and timing requests for meteorological information from at least one of the plurality of vehicles based at least in part on the age of an associated probabilistic value.

Example 10 is a method of implementing a probabilistic weather severity estimation system. The method includes generating a matrix containing nodes and vehicles monitoring meteorological conditions within a space volume. Each node is associated with a select part of space volume within the space volume. The coverage of the monitoring of meteorological conditions by each vehicle is tracked. Nodes of the matrix are associated with aircraft monitoring of meteorological conditions coverage. An optimization process is implemented to remove at least one of at least one node and at least one vehicle from the matrix. Vehicles monitoring meteorological conditions in accordance with the then optimized matrix are requested to transmit their then current monitored meteorological conditions. Probabilistic weather severity values are assigned to each node in the then current matrix based at least in part on received meteorological information from the vehicles monitoring meteorological conditions. A probabilistic weather severity estimation for future weather conditions within the space volume based at least in part on the assigning of probabilistic weather severity values in the matrix is then generated.

Example 11 includes the method of Examples 10, further including wherein the probabilistic weather severity values are associated with meteorological information related to at least one of intensity of precipitation, turbulence, lightening, hail, age of meteorological information and distance of a meteorological information gathering vehicle to the meteorological information.

Example 12 includes the method of any of the Examples 10-11, wherein the optimization process further includes determining overlaps of monitoring coverage of parts of space volume associated with nodes by at least two vehicles monitoring meteorological conditions. When a full overlap of monitoring coverage is found present in a select part of space volume associated with a node, removing at least one vehicle of the at least two vehicles monitoring meteorological conditions from being associated with the node in the matrix.

Example 13 includes the method of any of the Examples 10-12, wherein the optimization process further includes determining if the meteorological conditions of each part of space volume is being monitored by at least one vehicle. When a given part of space volume is not being monitored for meteorological conditions by at least one vehicle, removing an associated node from the matrix.

Example 14 includes the method of any of the Examples 10-13, wherein the optimization process further includes determining if a part of space volume is associated with rapidly changing weather conditions. When a part of space volume is not associated with rapidly changing weather conditions, removing the at least one node from the matrix for a period of time.

Example 15 includes the method of any of the Examples 10-14, wherein the optimization process further includes determining if at least one node is a non-efficient node based at least in part on having a similar probabilistic weather severity value of a nearby node. When it is determined that the at least one node is a non-efficient node, removing the at least one node from the matrix for a period of time.

Example 16 includes the method of any of the Examples 10-15, wherein the optimization process further includes tracking the age of the computed probabilistic weather severity values of each node. Requests for meteorological information from at least one of the plurality of vehicles are timed based at least in part on the age of an associated probabilistic weather severity value.

Example 17 includes a probabilistic weather severity estimation system. The system includes a transceiver, a memory, and a controller. The transceiver is configured to transmit and receive signals. The memory is used to store at least operating instructions and a matrix including nodes associated with parts of a space volume and vehicles gathering meteorological conditions within the space volume. The controller is in communication with the transceiver and the memory. The controller is configured to execute the instructions in the memory to populate the matrix with probabilistic weather severity values associated with the nodes based at least in part on received meteorological information from the vehicles gathering meteorological conditions within the space volume. The controller is further configured to generate probabilistic weather severity estimation information based on the probabilistic weather severity values and a model forecast. The controller is further still configured to implement an optimization process before updating the probabilistic weather severity values in the matrix.

Example 18 includes the system of Example 17, wherein the probabilistic weather severity values are associated with meteorological information related to at least one of intensity of precipitation, turbulence, lightening, hail, age of meteorological information and distance of a meteorological information gathering vehicle to the meteorological information.

Example 19 includes the system of any of the Examples 17-18, wherein the controller is configured to implement the optimization process by modifying the matrix by at least one of eliminating duplicate probabilistic values as the result of two or more vehicles monitoring the meteorological conditions at the same space volume, removing nodes associated with non-monitored parts of space volume and removing non-efficient nodes from the matrix.

Example 20 includes the system of any of the Examples 17-19, wherein the controller is configured to implement the optimization process by tracking the age of the computed probabilistic weather severity values associated with each node and timing requests for meteorological information from at least one of the vehicle based at least in part on the age of an associated probabilistic value.

Although specific embodiments and examples have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method implementing a probabilistic weather severity estimation system, the method comprising:
   gathering meteorological information from a plurality of vehicles based on a non-periodic iteratively optimized communication method that at least in part takes into consideration a vehicle's position and heading in relation to a weather event, the plurality of vehicles traveling through an airspace volume associated with a plurality of nodes;
   determining if an overlap of monitoring coverage of the airspace volume associated with at least one node of the plurality of nodes is present with at least two vehicles of the plurality of vehicles;
   when an overlap of monitoring coverage is found present with the at least two vehicles, removing at least one vehicle of the at least two vehicles from gathering meteorological information;
   re-gathering the meteorological information from a remainder of the plurality of vehicles; and
   calculating a probabilistic weather severity estimation for future weather conditions based at least in part on the gathered and/or re-gathered meteorological information and an assigning of computed probabilistic weather severity values to the plurality of nodes.

2. The method of claim 1, further comprising:
   providing the probabilistic weather severity estimation to at least one of the plurality of vehicles.

3. The method of claim 1, wherein the probabilistic weather severity values are associated with meteorological information related to at least one of intensity of precipitation, turbulence, lightening, hail and age of the meteorological information.

4. The method of claim 1, wherein the plurality of nodes are in a matrix, and the method further comprises:
   determining if parts of the airspace volume corresponding to nodes of the plurality of nodes are monitorable by at least one sensor of at least one vehicle, wherein the parts of the airspace volume corresponding to the nodes of the plurality of nodes are monitorable if the parts are being monitored by at least one sensor of at least one vehicle; and
   when a part of airspace volume corresponding to a node is not monitorable by at least one sensor of at least one vehicle, removing the node from the matrix.

5. The method of claim 4, further comprising:
   replacing the node in the matrix when the part of airspace volume becomes monitorable by at least one sensor of at least one vehicle.

6. A method implementing a probabilistic weather severity estimation system, the method comprising:
   gathering meteorological information from a plurality of vehicles based on a non-periodic iteratively optimized communication method that at least in part takes into consideration a vehicle's position and heading in relation to a weather event;
   calculating a probabilistic weather severity estimation for future weather conditions based at least in part on the gathered meteorological information and an assigning of computed probabilistic weather severity values to nodes in a matrix, each node being associated with a part of an airspace volume in which the plurality of vehicles are gathering the meteorological information;

determining if a part of the airspace volume associated with at least one node is associated with changing weather conditions estimated to change over a select period of time; and when the part of the airspace volume associated with the at least one node is not associated with changing weather conditions estimated to change over the select period of time, removing the at least one node from the matrix for the select period of time.

7. The method of claim 1, wherein the plurality of nodes are in a matrix, and the method further comprises:

determining if at least one node associated with a part of the airspace volume is a non-efficient node based at least in part on having a similar probabilistic weather severity value of a nearby node; and when it is determined that the at least one node is a non-efficient node, removing the at least one node from the matrix.

8. The method of claim 1, further comprising:

tracking ages of the computed probabilistic weather severity values of the plurality of node; and timing requests for meteorological information from at least one of the plurality of vehicles based at least in part on an age of an associated probabilistic value.

9. A method of implementing a probabilistic weather severity estimation system, the method comprising:

generating a matrix containing nodes associated with vehicles monitoring meteorological conditions within an airspace volume, the nodes corresponding to parts of the airspace volume;

tracking coverage of the monitoring of the meteorological conditions by the vehicles and associating the nodes of the matrix with the vehicles based on the tracked coverage of the monitoring of the meteorological conditions;

implementing an optimization process to remove at least one of at least one node and at least one vehicle from the matrix, wherein the optimization process to remove the at least vehicle from the matrix includes determining if an overlap of monitoring coverage of the airspace volume associated with at least one node of the plurality of nodes is present with at least two vehicles of the plurality of vehicles, and when an overlap of monitoring coverage is found present with the at least two vehicles, removing at least one vehicle of the at least two vehicles from the matrix and from gathering meteorological information;

requesting a remainder of the vehicles monitoring meteorological conditions in accordance with the then optimized matrix to transmit current monitored meteorological conditions;

assigning probabilistic weather severity values to each node in the then current matrix based at least in part on received meteorological information from the remainder of the vehicles monitoring meteorological conditions; and generating a probabilistic weather severity estimation for future weather conditions within the airspace volume based at least in part on the assigning of probabilistic weather severity values in the matrix.

10. The method of claim 9, wherein the probabilistic weather severity values are associated with meteorological information related to at least one of intensity of precipitation, turbulence, lightening, hail, age of meteorological information and distance of a meteorological information gathering vehicle to the meteorological information.

11. The method of claim 9, wherein the optimization process further includes:

determining if the meteorological conditions of the parts of the airspace-volume are being monitored by at least one vehicle; and when a part of airspace volume is not being monitored by at least one vehicle, removing an associated node from the matrix.

12. A method of implementing a probabilistic weather severity estimation system, the method comprising:

generating a matrix containing nodes associated with vehicles monitoring meteorological conditions within an airspace volume, the nodes corresponding to parts of the airspace volume;

tracking coverage of the monitoring of the meteorological conditions by the vehicles and associating the nodes of the matrix with the vehicles based on the tracked coverage of the monitoring of the meteorological conditions;

implementing an optimization process to remove at least one of at least one node and at least one vehicle from the matrix;

requesting aircraft monitoring meteorological conditions in accordance with the then optimized matrix to transmit their then current monitored meteorological conditions;

assigning probabilistic weather severity values to each node in the then current matrix based at least in part on received meteorological information from the vehicles monitoring meteorological conditions; and generating a probabilistic weather severity estimation for future weather conditions within the airspace volume based at least in part on the assigning of probabilistic weather severity values in the matrix, wherein the optimization process further comprises:

determining if a part of airspace volume is associated with changing weather conditions estimated to change over a select period of time; and when a given part of airspace volume is not associated with changing weather conditions estimated to change over the select period of time, removing the at least one node associated with the given part from the matrix for the select period of time.

13. A method of implementing a probabilistic weather severity estimation system, the method comprising:

generating a matrix containing nodes associated with vehicles monitoring meteorological conditions within an airspace volume, the nodes corresponding to parts of the airspace volume;

tracking coverage of the monitoring of the meteorological conditions by the vehicles and associating the nodes of the matrix with the vehicles based on the tracked coverage of the monitoring of the meteorological conditions;

implementing an optimization process to remove at least one of at least one node and at least one vehicle from the matrix;

requesting aircraft monitoring meteorological conditions in accordance with the then optimized matrix to transmit their then current monitored meteorological conditions;

assigning probabilistic weather severity values to each node in the then current matrix based at least in part on received meteorological information from the vehicles monitoring meteorological conditions; and generating a probabilistic weather severity estimation for future weather conditions within the airspace volume based at least in part on the assigning of probabilistic weather severity values in the matrix,
wherein the optimization process further comprises:
determining if at least one node is a non-efficient node based at least in part on having a similar probabilistic weather severity value of a nearby node; and
when it is determined that the at least one node is a non-efficient node, removing the at least one node from the matrix for a period of time.

14. The method of claim 9, wherein the optimization process further comprises:
tracking ages of the probabilistic weather severity values of the nodes; and
timing requests for meteorological information from at least one of the vehicles based at least in part on an age of an associated probabilistic weather severity value.

15. A probabilistic weather severity estimation system, the system comprising:
a transceiver configured to transmit and receive signals;
a memory to store at least operating instructions and a matrix including nodes associated with parts of an airspace volume and vehicles gathering meteorological conditions within the airspace volume; and
a controller in communication with the transceiver and the memory, the controller configured to execute the instructions in the memory to:
populate the matrix with probabilistic weather severity values associated with the nodes based at least in part on received meteorological information from the vehicles gathering meteorological conditions within the airspace volume,
generate probabilistic weather severity estimation information based on the probabilistic weather severity values and a model forecast,
implement an optimization process before updating the probabilistic weather severity values in the matrix,
wherein the optimization process includes:
determining overlaps of monitoring coverage of the parts of the airspace volume by at least two vehicles monitoring meteorological conditions;
when an overlap of monitoring coverage is found present in a part of the airspace volume associated with a node, removing at least one vehicle of the at least two vehicles from being associated with the node in the matrix and from gathering meteorological information; and
re-receiving the meteorological information from a remainder of the vehicles.

16. The system of claim 15, wherein the probabilistic weather severity values are associated with meteorological information related to at least one of intensity of precipitation, turbulence, lightening, hail, age of meteorological information and distance of a meteorological information gathering vehicle to the meteorological information.

17. The system of claim 15, wherein the controller is configured to implement the optimization process by modifying the matrix by at least one of eliminating duplicate probabilistic values as the result of two or more aircraft monitoring the meteorological conditions at the same part of the airspace volume, removing nodes associated with non-monitored parts of airspace volume, and removing non-efficient nodes from the matrix.

18. The system of claim 15, wherein the controller is configured to implement the optimization process by tracking ages of the probabilistic weather severity values and timing requests for meteorological information from at least one of the vehicles based at least in part on an age of an associated probabilistic value.

* * * * *